United States Patent
Dove

(10) Patent No.: US 7,478,341 B2
(45) Date of Patent: Jan. 13, 2009

(54) APPARATUS AND METHOD FOR PERSISTENT DISPLAY INTERFACE

(75) Inventor: Michael Dove, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 619 days.

(21) Appl. No.: 09/838,695

(22) Filed: Apr. 19, 2001

(65) Prior Publication Data

US 2001/0047435 A1 Nov. 29, 2001

Related U.S. Application Data

(60) Provisional application No. 60/198,315, filed on Apr. 19, 2000.

(51) Int. Cl.
*G06K 15/00* (2006.01)

(52) U.S. Cl. ........................ 715/790; 715/802

(58) Field of Classification Search ......... 715/802–804, 715/790–797, 766, 744–747, 762–763, 740–743, 715/805, 767, 705; 345/553, 606–611, 581, 345/629; 709/220, 231

See application file for complete search history.

(56) References Cited

U.S. PATENT DOCUMENTS

| | | | | |
|---|---|---|---|---|
| 5,469,540 A | | 11/1995 | Powers, III et al. | 395/158 |
| 5,479,497 A | * | 12/1995 | Kovarik | 379/265.03 |
| 5,640,498 A | * | 6/1997 | Chew | 715/790 |
| 5,796,402 A | * | 8/1998 | Ellison-Taylor | 715/792 |
| 5,796,969 A | * | 8/1998 | Orton et al. | 715/803 |
| 5,841,420 A | * | 11/1998 | Kaply et al. | 345/421 |
| 5,847,705 A | * | 12/1998 | Pope | 715/781 |
| 6,005,575 A | | 12/1999 | Colleran et al. | 345/344 |
| 6,008,809 A | * | 12/1999 | Brooks | 715/792 |
| 6,031,530 A | | 2/2000 | Trueblood | 345/342 |
| 6,040,833 A | * | 3/2000 | Henshaw | 715/794 |
| 6,310,657 B1 | * | 10/2001 | Chauvel et al. | 348/569 |
| 6,385,312 B1 | * | 5/2002 | Shaffer et al. | 379/211.02 |
| 6,411,312 B1 | * | 6/2002 | Sheppard | 715/769 |
| 6,473,103 B1 | * | 10/2002 | Bailey et al. | 715/794 |
| 6,518,983 B1 | * | 2/2003 | Grohmann et al. | 715/781 |
| 6,532,538 B1 | * | 3/2003 | Cronk et al. | 713/2 |
| 6,598,131 B2 | * | 7/2003 | Kedem et al. | 711/147 |
| 6,636,244 B1 | * | 10/2003 | Kelley et al. | 715/781 |
| 6,724,403 B1 | * | 4/2004 | Santoro et al. | 715/765 |
| 6,731,311 B2 | * | 5/2004 | Bufe et al. | 715/781 |
| 6,750,858 B1 | * | 6/2004 | Rosenstein | 715/790 |

(Continued)

FOREIGN PATENT DOCUMENTS

EP 0585191 3/1994

(Continued)

OTHER PUBLICATIONS

*Apple Computer, Inc. v. Articulate Sys., Inc..* 234 F.3d 14, 57 U.S.P.Q.2d (BNA) 1057 (Fed. Cir. 2000).

*Primary Examiner*—Steven P Sax

(57) ABSTRACT

An apparatus and method for maintaining a graphics display window on a display screen that will not be obscured by any other graphics display window. The graphic display apparatus comprises an arbiter, a gatekeeper and an access control table. The arbiter selects from among a plurality of computer applications requesting authorization on the display screen to display data. Authorization is granted via a persistence attribute. Once a persistence attributed is obtained, the graphics display window remains on the screen unobscured.

43 Claims, 9 Drawing Sheets

U.S. PATENT DOCUMENTS

| | | | |
|---|---|---|---|
| 6,760,048 B1 * | 7/2004 | Bates et al. | 715/797 |
| 7,007,240 B1 * | 2/2006 | Anderson et al. | 715/790 |
| 7,039,872 B1 * | 5/2006 | Raheman | 715/748 |
| 7,043,488 B1 * | 5/2006 | Baer et al. | 707/101 |
| 7,168,048 B1 * | 1/2007 | Goossen et al. | 715/797 |

FOREIGN PATENT DOCUMENTS

| | | | |
|---|---|---|---|
| JP | 07073181 A | * | 3/1995 |

* cited by examiner

APPARATUS AND METHOD FOR PERSISTENT DISPLAY INTERFACE

CROSS-REFERENCE TO RELATED APPLICATION(S)

This application claims priority of provisional patent application No. 60/198,315 filed Apr. 19, 2000, and incorporates said application by reference in its entirety.

BACKGROUND OF THE INVENTION

Modern computers employ human-computer interfaces (HCI) which enable users, including system administrators, programmers, and end users, to interact with one or more computer systems via an easy-to-use, visually-oriented display, typically on the screen of a computer monitor. The screen may have information divided into, and distributed among, one or more conceptual frames, called windows, through which the user manages, for example, data, files, system programs, and application programs.

Window-oriented operating systems (OS) are ubiquitous to the extent that nearly all contemporary computer systems implement one or more such systems. Such operating systems can include, without limitation, the open system architecture X-Windows which is supported worldwide by several hundred vendors and original equipment manufacturers (OEM); Mac-OS® by Apple Computer, Inc., Cupertino, Calif.; and the WINDOWS® family of operating systems from Microsoft Corp., Redmond, Wash.

In general, each of the one or more overlapping, often rectangular, windows acts like a separate terminal, and the user is able to perform different tasks in each window. The computer operating system employs one form of HCI, namely, a graphical user interface (GUI) to permit the user to take advantage of the computer's graphics capabilities to make a program easy to use. Indeed, a well-designed GUI manages windows in a manner that frees the user from learning complex command languages, and allows the user to interact with the data, files, system, and programs in an intuitive manner.

Windows have geometry as well as delimited regions, icons and different visual attributes associated with them. Display attributes typically are manipulated. The OS API at the lowest level often provides the interface with the pixels on the screen. At a higher level, a user interface API can build borders, insert title bars and stands, etc.

For certain applications, it is desirable to maintain a specific graphics display window on a screen that will not be obscured by any other window. This is typically accomplished through the Application Program Interface to the window. An "always on top" (AOT) attribute maintains a specific graphics display window on the screen, unobscured by any other window. Initially, a particular application program can seize and retain this attribute so long as no other application program requests it. A subsequently executed application program can take control of this attribute, and itself use the AOT feature. Clearly, this attribute is not in a persistent state, because it belongs to an application program so long as no other application program seizes control of it.

Some application programs try to implement a persistent, AOT attribute, by implementing a re-entrant loop, which is constantly setting the AOT attribute. If another application program attempts to seize the AOT attribute, the first program re-enters the loop and regains ownership of the attribute.

Another example of attempting to create a persistent display attribute, including an "Always, Always on Top" (AAOT) attribute which may be found in the case of a video overlay on a television card for a computer. In this example, the image bits are written directly into the display buffer. The operating system is generally unaware of what graphics display data is written to that section of the buffer, only knowing that the corresponding memory segment is reserved. Thus, the OS is undesirably prevented from having control over the data bits in the image display buffer. Another method of implementing an AOT attribute is to reserve portions of the screen buffer, to the detriment of the operating system. The OS is unable to take advantage of these reserved portions of the screen buffer because they are hidden from the OS.

Current attributes typically are assigned according to a most-recently-requested basis, or a first-come-first-serve basis. However, it is desirable to assign an attribute such that it always preempts other attributes.

SUMMARY OF THE INVENTION

The present invention satisfies the above needs by providing apparatus, method and computer program products which assigns a persistent attribute and, in particular, a master persistent display attribute, that is capable of preempting other attributes assigned or seized during the typical course of display operation. According to the invention, a graphics display window can be maintained on a display screen without being obscured by any other window.

One inventive apparatus produces a perceptible representation of data, and includes an arbiter that selects a dominant program from among multiple programs seeking a master persistence attribute to display program data according to a predetermined priority technique, and assigns the master persistence attribute to the dominant program. In addition, the arbiter can be coupled with an access control table which contains indicia representative of the predetermined priority scheme. Such indicia can include process ID (PID), window ID (WID), priority, revoked and repudiated credentials, authentication token or key, master persistence attribute authorization, descriptive text, program status, system status, an accessible display region, and an excluded display region. The arbiter can be configured with the predetermined priority scheme with a configuration application program, coupled with the access control table. An I/O manager can be used to manage display between the program and the display, and can communicate the data through an intervening graphics device driver. Moreover, the graphics device driver can be coupled with a graphics display buffer. The arbiter can include a rules engine, a state machine, and a content-addressable memory that provides the predetermined priority scheme for determining dominant program priority. The apparatus also can be configured to include a gatekeeper which determines selected ones of programs to be granted access to the arbiter to receive the master persistence attribute according to a predetermined access scheme. The gatekeeper can be coupled with a configuration table, which stores an indicia representative of the predetermined access scheme. These indicia can include a process ID (PID), window ID (WID), priority, revoked and repudiated credentials, authentication token or key, master persistence attribute authorization, descriptive text, program status, system status, an accessible display region, and an excluded display region. The apparatus also may be configured to employ a gatekeeper alone, in which case the gatekeeper will determine the priority of programs seeking an attribute and grant the attribute accordingly.

In another embodiment, the invention can include a graphics system, which includes a video input receiving a graphical data signal; a video output coupled with a display; a display controller coupled to the video input signal and selectively transmitting the graphical data signal to the video output; and an arbiter coupled to the display controller, the arbiter effecting the selectively transmitting by granting a persistence attribute according to a predetermined priority scheme. The display controller can selectively transmit the graphical data signal, responsive to the arbiter. This embodiment also can include a CPU interface which couples the graphics system with a CPU. The CPU receives and transmits display control signals. The arbiter is responsive to the display control signals transmitted by the CPU. The CPU can include a gatekeeper, which is operably coupled with the arbiter and which transmit the predetermined priority scheme thereto. Either, or both, of the arbiter and the gatekeeper can have a table coupled respectively therewith, which stores indicia relevant to the respective access or priority scheme. These indicia can include process ID (PID), window ID (WID), priority, revoked and repudiated credentials, authentication token or key, master persistence attribute authorization, descriptive text, program status, system status, an accessible display region, and an excluded display region.

The invention also includes a method of assigning a persistence attribute to at least one of a plurality of dominant programs, including requesting the master persistence attribute from a gatekeeper; assigning a set of priority rules to the gatekeeper via a configuration application program; the gatekeeper granting keys to selected dominant application programs allowing access to an arbiter; the arbiter examining an arbiter access control table storing the predetermined priority scheme; and the arbiter assigning the persistence attribute to the at least one of a plurality of dominant application programs granting access to a display window.

Furthermore the invention can include a computer program product recorded on a computer readable medium that implements the inventive method herein as well as is functionally equivalent to the several apparatus described herein.

The present invention will be more fully understood from the following detailed description of the embodiments thereof, taken together with the following drawings.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION OF THE INVENTION

Figure 1:
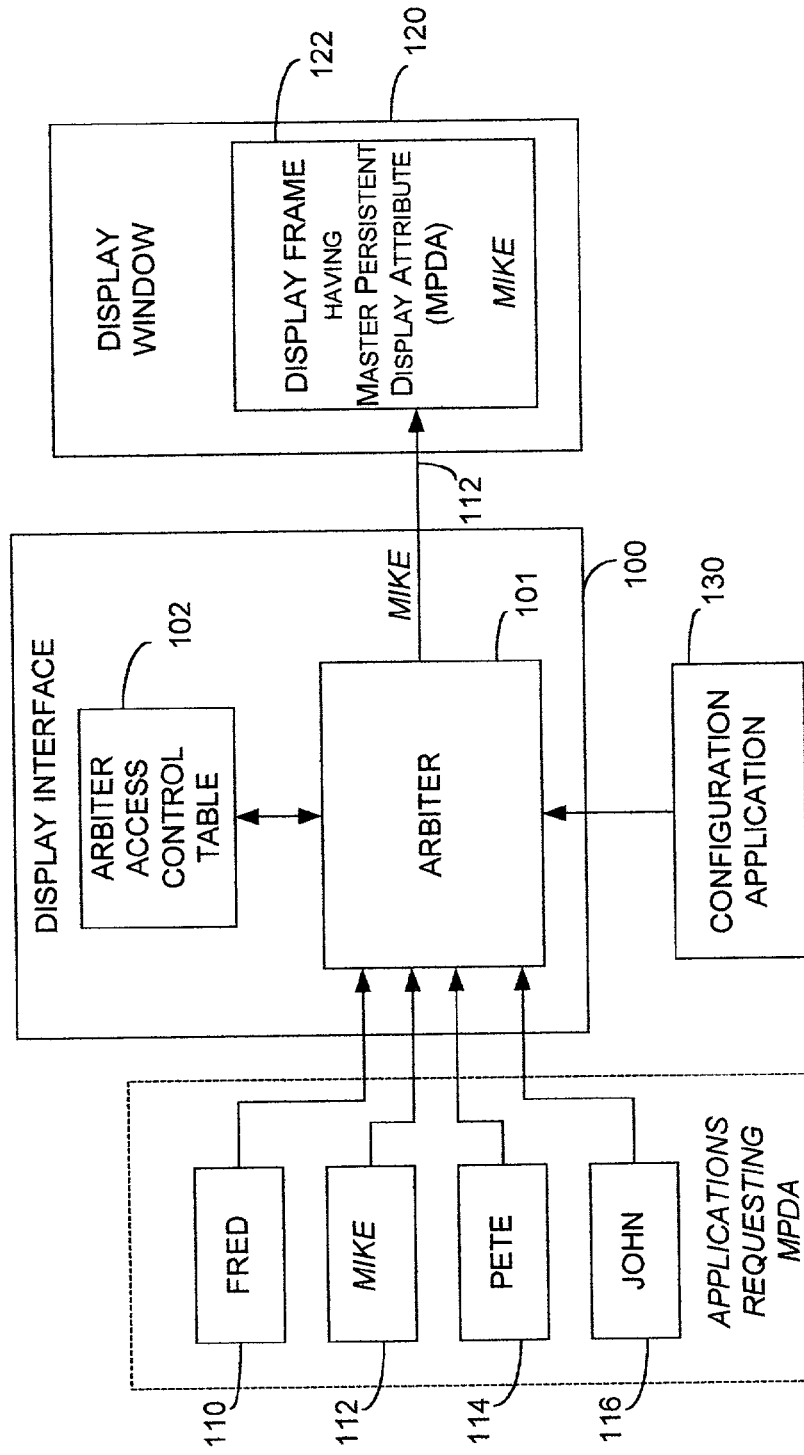
FIG. 1 is illustrates a display interface according to the present invention using an arbiter.

The present invention provides apparatus and methods that provide one or more master, persistent interface attributes (MPIA), which continually maintains a specific HCI attribute in a selectable state. Except for the operation of MPIA apparatus and methods therefor, the selectable state can not be altered, or superceded, by programs, routines, or code, which otherwise would be capable of altering the state of the attribute.

For example, in the case of a visually-oriented HCI, such as a GUI, or window, the persistent interface attribute could be a master, persistent display attribute (MPDA) such as, for example, an "Always, Always on Top" (AAOT) MPDA that maintains a preselected graphics display window, subwindow, or frame, (collectively, a "window") granted the attribute, at the highest Z-order level, without being overwritten. As used herein, "Z-order" describes the apparent visual depth of a window in a display. For example, a window or subwindow of a higher Z-order can appear to overlay partially, or completely, a window, subwindow, frame, or pane, of a lower Z-order. Also as used herein, a "window" can include predefined portions of a display including, without limitation, title bars, icons, status monitor indicators, system trays, and the like.

In some implementations, it may be desirable that the AAOT MPDA be implemented through the code in the OS that deals with writing the pixels on the screen so that, if a particular window is assigned that attribute, no other window, or subwindow, being rendered on the screen, would have access to write to those pixel memory locations, which occurs when a window overlaps. Preferred embodiments of the present invention implement arbitration, which can assigns a MPIA, such as an MPDA, according to a predetermined priority technique. It is desirable that the priority scheme of the present invention determine those programs which are eligible to make use of the MPDA and, of those, which program which actually receives it. Where a program has possession of the MPDA, the priority scheme and whether that program should retain possession.

In one implementation, this functionality could be present in the OS, preferably at the lowest level, where there can be some arbitration for access to the screen resources. Thus, it is desirable that the OS arbitrate, for example, the pixels on the screen with the AAOT, or the "Z-ordership, persistents display attribute, such that no other application program other than the application program granted the MPDA, may access and overwrite those pixels.

One example of an application for such a priority scheme includes providing a persistent pop-up display window for transmitting critical information from an emergency broadcasting system in case of hurricane, earthquake, tornado or the like, whether the user display is supplied via cable, telephonic, broadcast, or wireless services. Because it is contemplated that the present invention have multimodal interface capability, the present invention is not limited to visually-oriented interfaces, e.g., visual displays, but also can include textual, audio, and other forms of perceivable information, and combinations thereof. However, for clarity, all such perceivable representations will be called "displays" herein. Furthermore, although aspects of the invention herein may be described in terms of a visually-oriented interface as implemented on a stand-alone personal computer (PC), this limitation also is solely for the purpose of clarity and is an artifact of presentation. Indeed, aspects of the present invention can be implemented on networked computers, including servers, and in a myriad of communication devices, including without limitation, handheld computing devices, wireless telephones, set-top boxes, cable modems, and the like.

In the context of the present invention, a "computer" can include, of course, a present-day traditional, stand-alone computer, as well as any intelligent device capable of receiving, transforming and producing a representation of data that is perceptible to one or more senses. Also as used herein, the term "program" can include programs, processes, threads, and the like, whether invoked by a user application, a system resource, a supervisory monitor, a configuration program, and so forth. Moreover, any or all components of the present invention can be implemented in hardware, software, or a combination thereof.

FIG. 1 illustrates a display interface 100, according to the present invention. In many operating systems, the ultimate ownership of a graphics display window is non-exclusively granted to a program or process on a first-come, first-served basis. Because embodiments of the present invention are preferred to implement arbitration, according to a predetermined priority technique, arbiter 101 is provided to selects from among computer programs 110, 112, 114 and 116 that are requesting an MPDA. Typically, ownership or control of a portion of a display is non-exclusive to the extent that a second, later-executing program or process can acquire ownership or control of a graphics display portion at the expense of a prior owner. This can result in the first display window being overwritten or superceded in Z-ordership by the subsequent program. Thus, arbiter 101 can determine which of programs 110, 112, 114, 116 will be exclusively granted ownership of an MPDA and access to selected pixel memory locations, which locations have predetermined portions of the graphical display corresponding therewith. Also, windows and sub-windows typically overlap visually on a first-come, first-served, Z-order priority basis. Arbiter 101 can assign an exclusive Z-order to a particular window, subwindow, or frame.

Arbiter 101 also can be configured to determine where the programs and process granted an MPDA may place graphical data, a display frame, or a subwindow on a display. The MPDA could be assigned to the graphics display window, e.g., subwindow 122, that is to be maintained unobscured by any other window on display screen 120.

Arbiter 101 can include a very simple rules engine which allocates priority using a predetermined rule set. Arbiter 101 receives MPDA access requests from programs 110, 112, 114, 116, and can interpret the requests to determine which program will be allowed to access a particular region of display 120 and to receive the MPDA. If a priority conflict arises among programs 110, 112, 114, 116, then arbiter 101 also can be configured to resolve the conflict using the predetermined rule set. Arbiter 101 also may perform request authentication, and deny access to programs 110, 112, 114, and 116, if the request is determined to be inauthentic.

In addition to, or in place of, the internal rule set, arbiter 101 can cooperate with arbiter access control table 102 to establish the access priority relative to display subwindow 122 in display window 120. Specifically, the arbiter access control table 102 can store information regarding which program 110, 112, 114, 116 may be granted the MPDA. can include pertinent credentials, including, without limitation, process ID (PID), window ID (WID), priority, revoked and repudiated credentials, authentication token or key, MPDA authorization, descriptive text, program status, system status, accessible and excluded display regions, and the like. A process may open multiple windows, thus, it may be desirable to assign a MPDA to all windows in that process, and, then, allow the process to further determine access by related subprocesses to corresponding frames, panes, subwindows, and so forth in the windows accessed by that process. When arbiter access control table 102 is employed, arbiter 101 may be configured to draw solely upon the information in look-up table 102 to decide which of programs 110, 112, 114, and 116, will receive access to the MPDA and, if granted, the priority of such access. Alternatively, arbiter 101 can be configured to cooperate with table 102 to dynamically allocate and reallocate an MPDA among one or more programs or processes.

Figure 2:
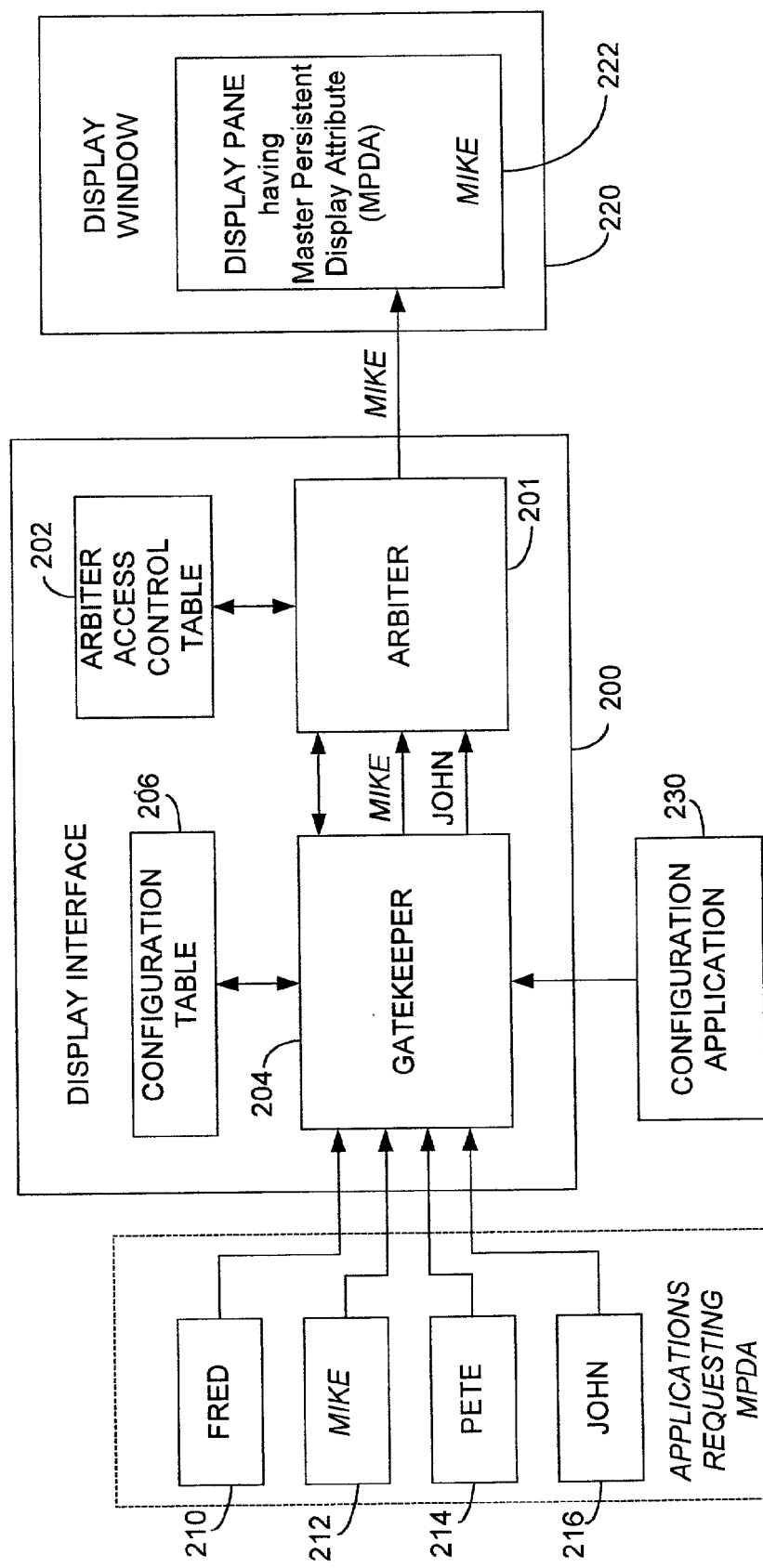
FIG. 2 illustrates a display interface according to another embodiment using an arbiter and a gatekeeper.

FIG. 2 illustrates another embodiment of a display interface 200 according to the present invention, in which gatekeeper 204 is used to decide whether access to arbiter 201 is granted or denied. Display interface 200 also can include arbiter access control table 202, which can be similar to arbiter access control table 102 in FIG. 1. Display interface 200 also may employ gatekeeper configuration table 206 to store application-specific access information for use by gatekeeper 204. In one embodiment of the invention herein, gatekeeper 204 can receive a request for an MPDA from programs 210, 212, 214 and 216, and select which of programs 210, 212, 214, 216, will be permitted to access arbiter 201 with an MPDA request. The selection may be based upon configuration parameters stored in gatekeeper configuration table 206, which can be provided by way of configuration application 230. Arbiter access table 202 can contain parameters specific to those programs, or classes of programs, that will be permitted to request an MPDA. In addition, arbiter 201 also may be programmed with one or more predetermined rules governing granting of an MPDA. Based on the information stored in table 202, or the predetermined rules, arbiter 201 can allow a selected program 210, 212, 214, 216 to employ an MPDA to create display frame 222, within display window 220.

In one embodiment of the present invention, gatekeeper 204 can accept requests from programs 210, 212, 214, 216, which may request an MPDA and, if the requester is entitled to access arbiter 201, gatekeeper 204 issues a corresponding key or token, allowing access to arbiter 201. In one implementation, gatekeeper 204 can selectively grant access by programs 210, 212, 214, 216 to arbiter 201. In addition, gatekeeper 204 can selectively assign priority to programs 210, 212, 214, 216, as well as manage authentication data regarding programs which gatekeeper 204 may encounter during initialization or runtime. In the latter case, gatekeeper 204 further can be configured to provide each of selected ones of programs 210, 212, 214, 216, with a key or token, to present to arbiter 201 at a specified time during program execution. Configuration control table 206 can be used to store and communicate information, including the aforementioned program credentials, about classes of programs as well as specific programs, which gatekeeper 204 may encounter. This information can include can include pertinent credentials, including, without limitation, process ID (PID), window ID (WID), priority, revoked and repudiated credentials, authentication token or key, MPDA authorization, descriptive text, program status, system status, accessible and excluded display regions, and the like.

When arbiter 201 receives a key from one of programs 210, 212, 214, 216, it can then determine whether the key is authentic and, if it is, assign an MPDA to a selected program, granting access to display 220, or a predetermined portion thereof, for example, display frame 222. Arbiter 201 also can cooperate with arbiter access control table 202 to store and manage information relating to, for example, programs authorized to access arbiter 201. This information also can include pertinent credentials, including, without limitation, process ID (PID), window ID (WID), priority, revoked and repudiated credentials, authentication token or key, MPDA authorization, descriptive text, program status, system status, accessible and excluded display regions, and the like.

In one embodiment of the invention herein, both arbiter 201 and gatekeeper 204 can be realized completely in software, for example, in the operating system kernel. In other embodiments, the functions of arbiter 201 and gatekeeper 204 can be distributed in both software and hardware, whether the functions are resident in a particular device, or distributed across multiple devices. Although configuration by an end user may be desirable under some circumstances, it is typically preferred that gatekeeper 204 and, thus, arbiter 201, be configured by a network administrator, original equipment manufacturer (OEM), value-added retailer (VAR), system provider, or other authorized user, so that the capability to use an MPDA is restricted to beneficial and intentional uses. Thus, it may be desirable to realize gatekeeper 204, as well as arbiter 201, as a protected kernel level function. Access to gatekeeper 204, gatekeeper configuration table 206, arbiter 201, and arbiter access control table 202, may be implemented via a concealed user-level function, for example, an undocumented Application Program Interface (API), or, where the Microsoft Windows® OS is used, via the system registry (WINDOWS® is a trademark of Microsoft Corp., Redmond, Wash.), although other known access-control techniques may be used. Gatekeeper 204 can provide housekeeping services to arbiter 201 by dynamically indicating changes of program status, accessible and excluded display regions, revoked and repudiated credentials, and the like.

In yet another embodiment of the invention, gatekeeper 204 can be operable on one computer physically distinct from the computer on which arbiter 201 is operable. Therefore, the invention herein also contemplates being implemented in an environment of networked wired and wireless intelligent devices.

The aforementioned principles are now illustrated by example, using FIG. 2. In one example, upon initialization, program "FRED" 210, program "MIKE" 212, program "PETE" 214, and program "JOHN" 216, can communicate with gatekeeper 204 to request access to, and authorization to later use the MPDA attribute by, arbiter 201 during program run time. Based on internal rules, or with information stored and managed in gatekeeper configuration table 206, or both, gatekeeper 204 access to arbiter 201 can be granted to program "MIKE" 212 and program "JOHN" 216. In turn, based on internal rules, information stored and managed in access control table 202, or both, arbiter 201 can select program "MIKE" 212 to access display window 220, granting exclusive control over display frame 222 to program "MIKE" 212, and denying access by program "JOHN" 216.

In an alternative embodiment, also illustrated by FIG. 2, program "FRED" 210, program "MIKE" 212, program "PETE" 214, and program "JOHN" 216, can communicate with gatekeeper 204 to request future access to arbiter 201. This time, program "FRED" 210, program "MIKE" 212, and program "JOHN" 216, each are determined by gatekeeper 204 to be allowed access to arbiter 201. Each are provided with credentials, including perhaps a key, that will permit access to arbiter 201. Some, or all, of the information constituting the credentials for a particular program may be maintained by the respective program, or may be retained in part by gatekeeper 204, arbiter 201, or both. If program "PETE" 214 is not authorized to access display window 220, gatekeeper 204 denies program 214 access to arbiter 201. Assume now arbiter 201 communicates with gatekeeper 204 that, until further notice, it can only allow access by two additional programs. Also assume that, for the purposes of the present example, program "MIKE" 212 and program "JOHN" 216 were granted higher priorities than program "FRED" 210. When program "FRED" 210, program "MIKE" 212, and program "JOHN" 216 communicate corresponding credentials to gatekeeper 204, seeking access to arbiter 201, only program "MIKE" 212, and program "JOHN" 216 are granted access. Access to arbiter 201 by program "FRED" 210 may be deferred until arbiter 201 is able to accept access by program 210, or may be cancelled altogether.

Figure 3:
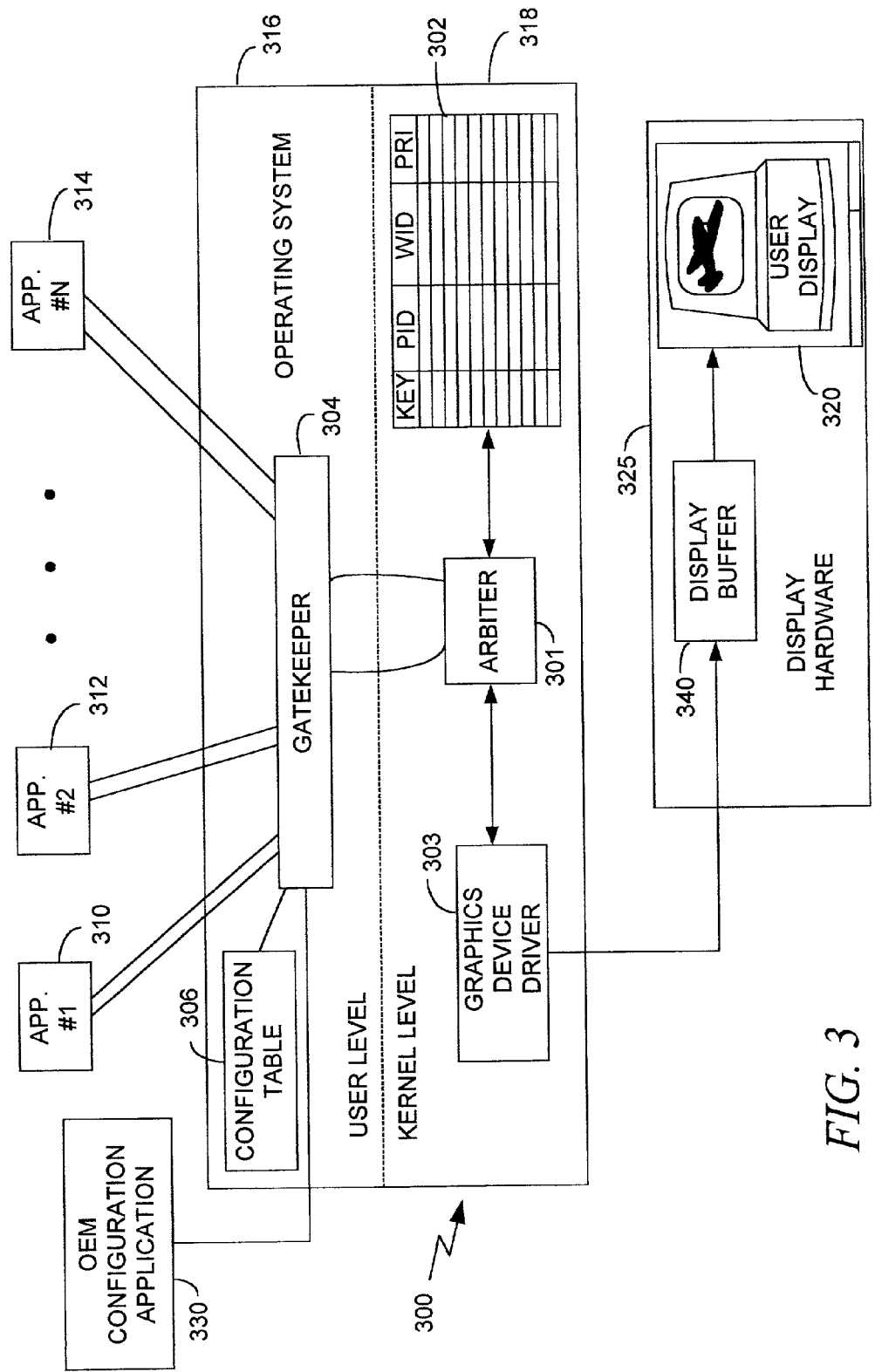
FIG. 3 illustrates a software embodiment of the display interface invention in the context of an operating system.

FIG. 3 illustrates yet another embodiment of a display interface according to the present invention, this time in the context of operating system 300. Similar to the embodiments described relative to FIG. 1 and FIG. 2, the embodiment illustrated in FIG. 3 includes arbiter 301. Similar to FIG. 2, the embodiment illustrated in FIG. 3 can include arbiter access control table 302, gatekeeper 304, and gatekeeper configuration table 306. Both tables 302 and 306 may include pertinent credentials, including, without limitation, process ID (PID), window ID (WID), revoked and repudiated credentials, authentication token or key, MPDA authorization, priority, descriptive text, program status, system status, display status, accessible and excluded display regions, and the like. The actual information maintained in either table can depend upon the functionality desired of arbiter 301 and gatekeeper 304.

In this embodiment of the invention, gatekeeper 304 and table 306 can be maintained at the user level of operating system 300, and arbiter 301 and table 302 can be maintained at the more secure kernel level of the operating system 300. Arbiter 301 communicates with graphics device driver 303 which, in turn, writes graphical data to display buffer 340 from those programs 310, 312, 314 authorized to do so by arbiter 301. The data written into hardware buffer 340 is depicted on display 320, in the manner suited for display hardware 325.

During initialization, selected programs 310, 312, 314 can request authorization to create an exclusive, persistent window on display 320. Where used, gatekeeper 304 can process a request by programs 310, 312, 314 to create a graphical entity on display 320, which may possess special attributes, including, for example, a master persistent display attribute, such as the AAOT MPDA. Application programs 310, 312 and 314 can communicate with gatekeeper 304, requesting authorization to access arbiter 301 which, in turn, can authorize access to user display 320 using, for example, a MPDA. Programs 310, 312, 314 can provide credentials to gatekeeper 304 as part of the authorization process. Advantageously, gatekeeper can employ gatekeeper configuration table 306 to store and manage program credentials as well as additional credentials, including keys, issued by arbiter 301 and gatekeeper 304. Responsive to the credentials provided, gatekeeper 304 may grant, or deny access to arbiter 301 by programs 310, 312, 314. The response of gatekeeper 304 to programs 310, 312, 314 can be based upon simple rules programmed into gatekeeper 304, or in the alternative, information that is stored in an gatekeeper configuration table 306. Where gatekeeper 304 is not desired, programs 310, 312, 314 can provide credentials, keys, or tokens, directly to arbiter 301.

Selected programs 310, 312, 314 may then access arbiter 301 immediately, or receive an authenticating token or security key from gatekeeper 304 for later use during the program's run time. When accessed, arbiter 301 can determine which of programs 210, 312, 314 is permitted to use a MPDA, and in which specified region of user display 320 particular program 310, 312, 314 is allowed to provide its display/information. This determination can be based upon simple rules programmed into arbiter 301 or, in the alternative, upon information that is stored in an arbiter access control table 302. Furthermore, either or both of arbiter 301 and gatekeeper 304 can be selectively controlled and supervised by one or more software agents. Agents are software programs that are capable of autonomous, flexible, purposeful and reasoning action in pursuit of one or more goals. Such agents can operate within a single computer environment, or across a disseminated interwork of computers.

Figure 4:
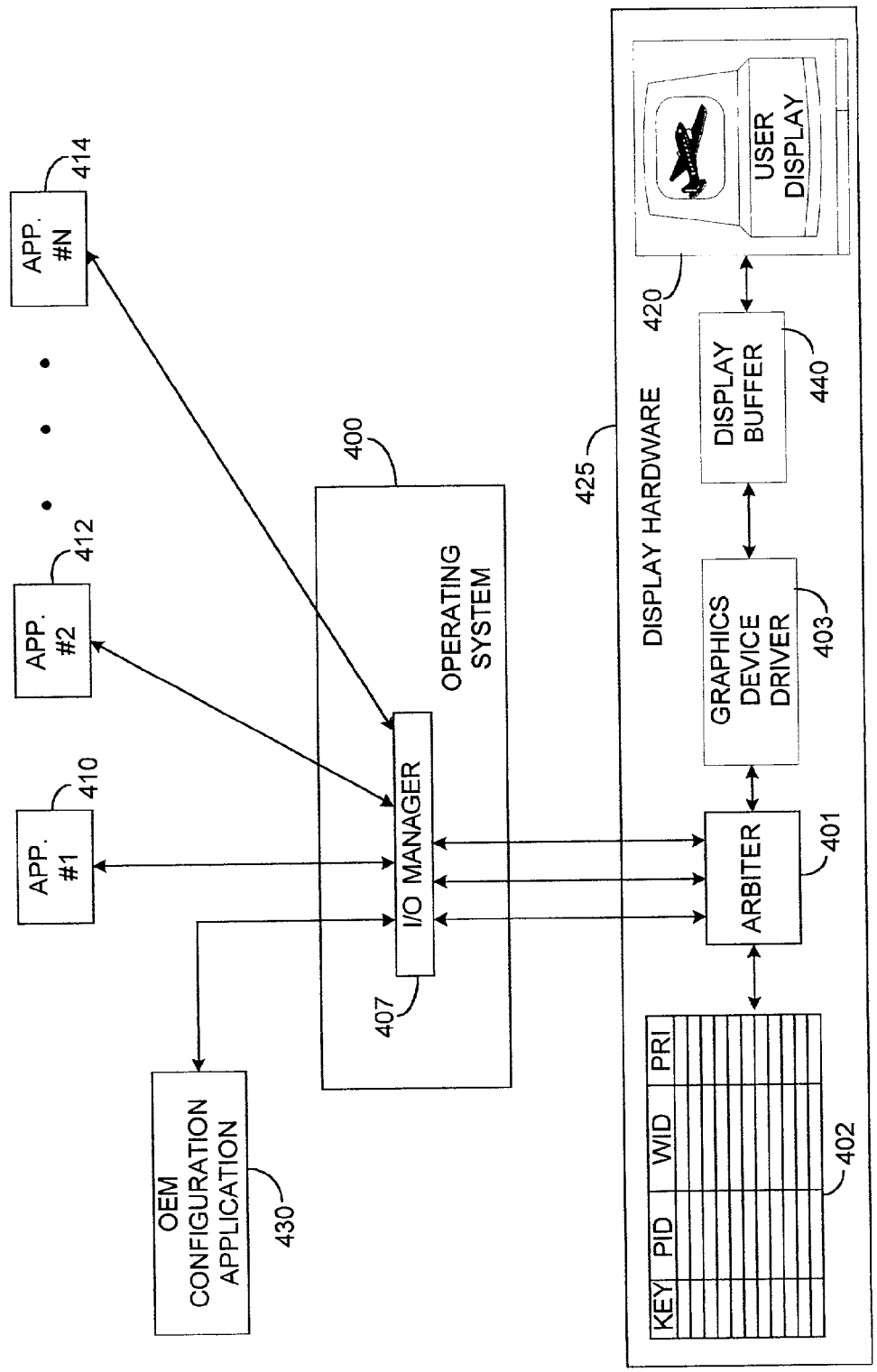
FIG. 4 illustrates an embodiment of a display interface invention where an arbiter is implemented in graphics display hardware.

FIG. 4 illustrates yet another embodiment of a display interface according to the present invention. A display interface having arbiter 401 is implemented in display hardware 425. In this configuration, a gatekeeper is not implemented and arbiter 401 alone selects among application programs 410, 412, 414 which will be permitted to express the MPDA on user display 420. Arbiter 401 can receive application program access parameters from OEM configuration application 430 via I/O manager 407. I/O manager 407 can be located in solely software, and can control all system input and output. I/O manager 407 also can be implemented in hardware, or firmware. The implementation in FIG. 4 can be suitable where a general purpose operating system is not used, and it is desirable to use a minimalistic program, rules engine, or state machine to implement the arbiter access functionality. These parameters may be used by arbiter 401 to determine which application program, 410, 412 or 414, will have access to a specific display region of user display 420. The access determination by arbiter 401 may either be by one or more simple rules, or by reference to arbiter access control table 402. Table 402 can include such information as a security token or authentication key, a process ID (PID), window ID (WID) and, if desired, priority. Once an application program has been granted a MPDA by arbiter 401, it accesses graphic display device driver 403 which in turn writes the application program's graphic data to display buffer 440. The application program's display data in display buffer 440 then is made available on user display 420.

Figure 5:
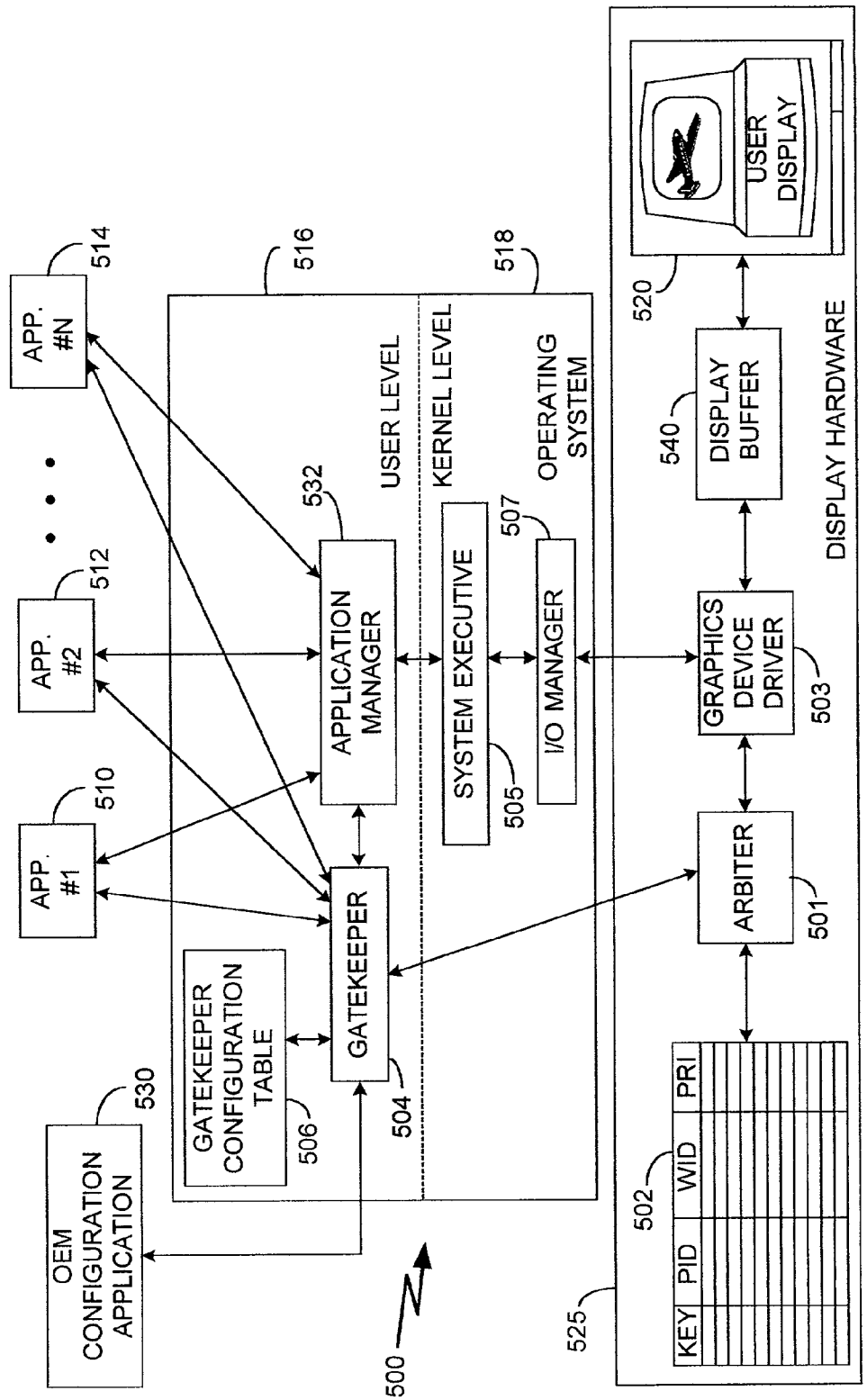
FIG. 5 illustrates an embodiment of the present invention where a gatekeeper is implemented in software and an arbiter is implemented in hardware.

In FIG. 5, still another embodiment of the display interface is presented. In this configuration, however, gatekeeper 504, and corresponding configuration table 506, are maintained in software and operating system 500, preferably at user level 516. Also, arbiter 501 and its corresponding arbiter access control table 502 are implemented directly in display hardware 525. Application programs 510, 512 and 514 communicate with gatekeeper 504 requesting authorization to access arbiter 501 which can permit access to user display 520 using a MPDA. Gatekeeper 504 may grant, or deny, the application programs access to arbiter 501.

During the normal operation of operating system 500, application manager 509 made manage requests for resources from application programs 510, 512, 514, and negotiate with system executive 505 for those resources. Typically, when an application program has need to display information on user display 520, the system executive 505 direct the output request to I/O manager 507 which, in turn, transmits the information to graphics device driver 503. Graphics device driver 503 then inputs the information into display buffer 540, allowing the information, now in suitable format, to be read and displayed by user display 520. In accordance with the present invention, arbiter 501 communicates with, and controls, graphics device driver 503 such that only preselected ones of application programs 510, 512, 514, are permitted to access the graphics device driver 503 with a MPDA. Gatekeeper 504 can communicate with arbiter 501 directly, or through interaction with operating-system 500. OEM configuration application 530 may be used during the initial system set-up, to supply gatekeeper configuration table 506 with preselected information, thus determining the manner in which gatekeeper 504 will respond to certain requests from application programs 510, 512, 514, as well as application manager 509. Both tables 502 and 506 may include pertinent credentials, including, without limitation, process ID (PID) window ID (WID), priority, revoked and repudiated credentials, authentication token or key, MPDA authorization, descriptive text, program status, system status, accessible and excluded display regions, and the like.

Figure 6:
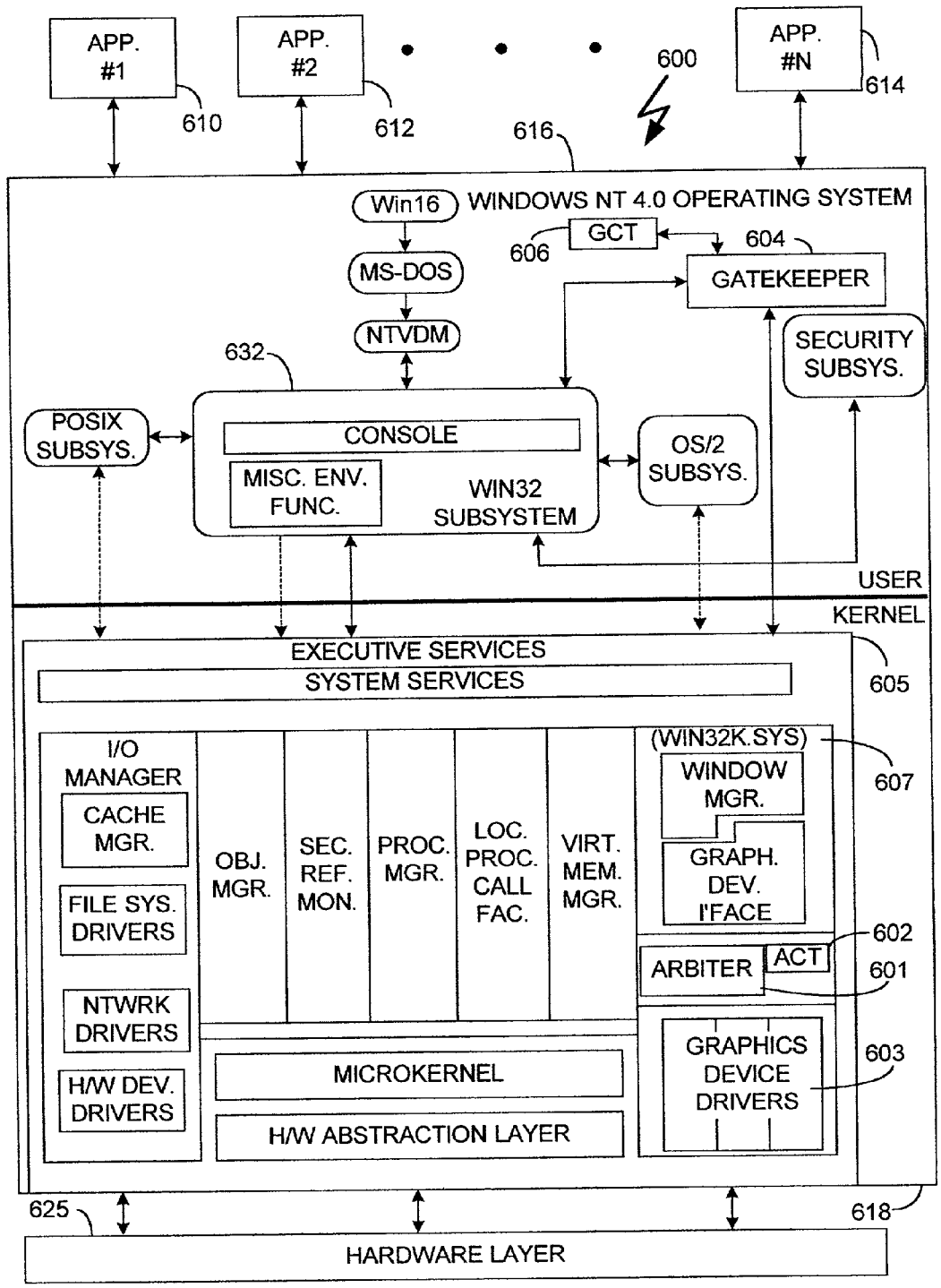
FIG. 6 illustrates a software embodiment of the display interface invention in the context of the Microsoft WINDOWS® NT® 4.0 operating system.

FIG. 6 illustrates an embodiment of the present invention, as an example, in the context of the Microsoft WINDOWS NT® 4.0 operating system 600. (NT® is a trademark of Microsoft Corp., Redmond, Wash.). Typically, application programs 610, 612, 614 interact with operating system 600 which includes a user level 616 and kernel level 618, to transmit display requests to the graphics display by (not shown) through hardware layer 625. For example, a request by a application program 612 to provide a graphical display can be passed to WIN32 subsystem 609, which then passes the request to the executive services function 605 within kernel level 618. The graphical display request then is processed by WIN32K. SYS 607, with the graphical information being transformed by graphics device drivers 603 into a format appropriate for the ultimate display device.

In this particular embodiment, application programs 610, 612 and 614 request authorization to use a MPDA from gatekeeper 604 which requests may be granted or denied depending upon gatekeeper configuration information. Contact with the gatekeeper 604 can be implemented by way of WIN32 subsystem 620. In this embodiment, arbiter 601 may be implemented within the operating system 600 in kernel mode 608 within the context of a windows and graphics components of WIN32K.SYS 617 and graphics device drivers 603. In one embodiment of this configuration, arbiter 601 allows selected ones of application program 610, 612, 614 to pass graphical data to graphics device drivers 603 according to rules established within arbiter 601. Graphics device driver 603, in turn, transmits graphic data to hardware layer 625 for perceptible visual display. Arbiter 601 and gatekeeper 604 may be used in conjunction with respective access control and configuration tables (now shown), as illustrated in FIGS. 1 through 5. Also, gatekeeper 604 can reside in a device physically separate from the one in which arbiter 601 resides allowing for remote configuration by network supervisors and the like.

Figure 7:
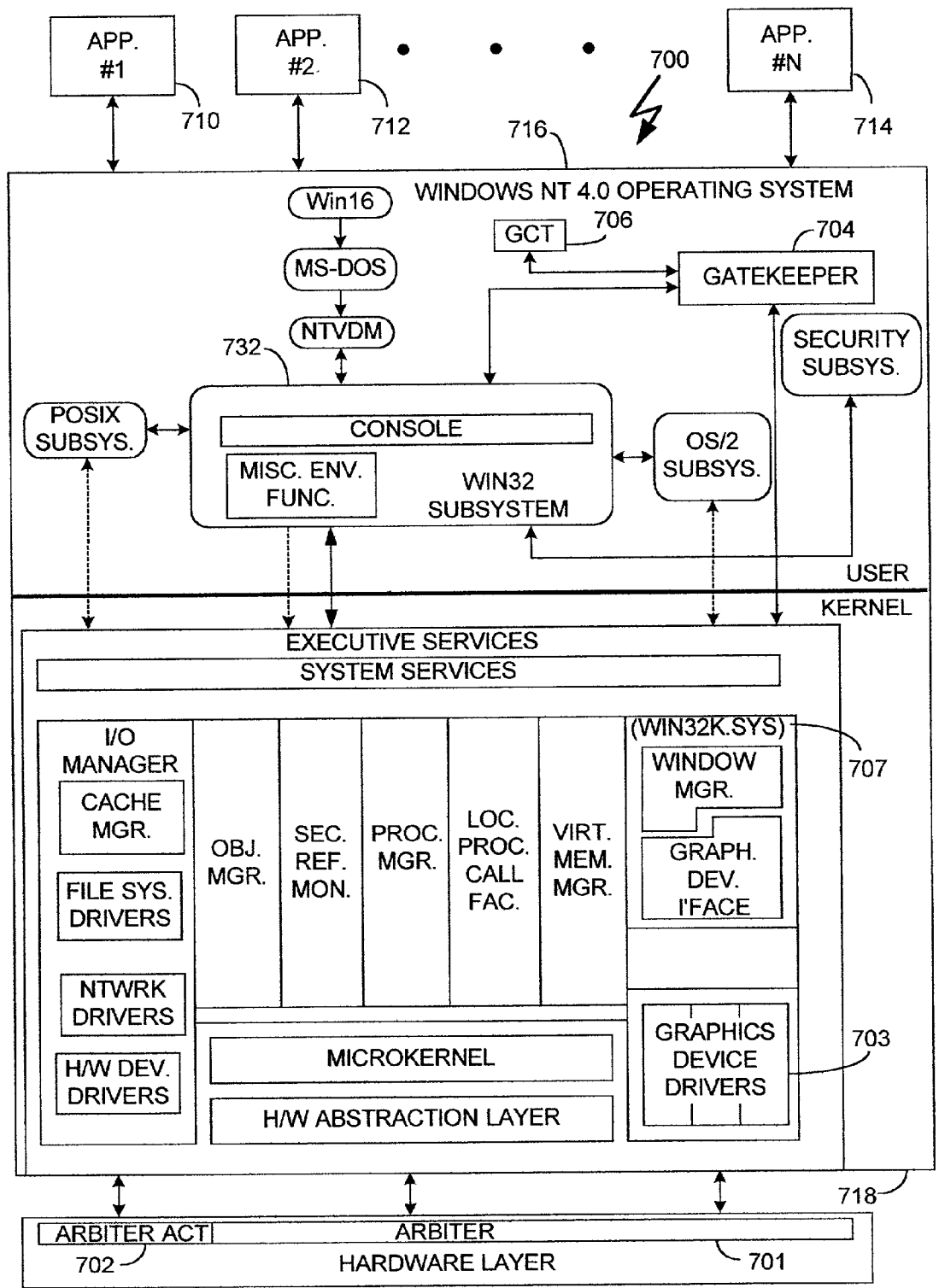
FIG. 7 illustrates an embodiment of the present invention where a gatekeeper is implemented in software and an arbiter is implemented in hardware, in the context of the Microsoft WINDOWS® NT® 4.0 operating system.

In FIG. 7, another embodiment of the display interface according to the present invention is illustrated in the context of Windows® NT® 4.0 operating system 700. As with the example in FIG. 6, application programs 710, 712, 714 can interact with operating system 700 which includes a user level 716 and kernel level 718, to transmit display requests to the graphics display by (not shown) through hardware layer 725. For example, a request by a application program 712 to provide a graphical display can be passed to WIN32 subsystem 709 at user level 716, which then passes the request to the executive services function 705 at kernel level 718. The graphical display request then is processed by WIN32K.SYS 707, with the graphical information being transformed by graphics device drivers 703 into a format appropriate for the ultimate display device.

In FIG. 7, the arbiter 701 and, if desired, arbiter look-up table 702, are implemented in hardware layer 725. Similar to gatekeeper 604 in FIG. 6, gatekeeper 704 in FIG. 7 can select among application program 710, 712 and 714 to have access to arbiter 701 and thus, an MPDA, by selected configuration parameters, which may stored in gatekeeper configuration table 706. Both tables 702 and 706 can include pertinent credentials, including, without limitation, process ID (PID), window ID (WID), priority, revoked and repudiated credentials, authentication token or key, MPDA authorization, descriptive text, program status, system status, accessible and excluded display regions, and the like. Arbiter 701 can reside on a device physically separate from gatekeeper 704, and thus those application programs which ultimately receive a MPDA can be controlled and configured by, for example, a network supervisor or monitor on a remote system. Although the Windows NT 4.0 operating-system is used to illustrate the aforementioned principles, it is to be understood that the invention herein is not limited to being implemented in a computer operating-system, but also can be implemented functionally using, for example, ASICs and other custom logic circuits, whether discrete or embedded in other functional devices.

Figure 8:
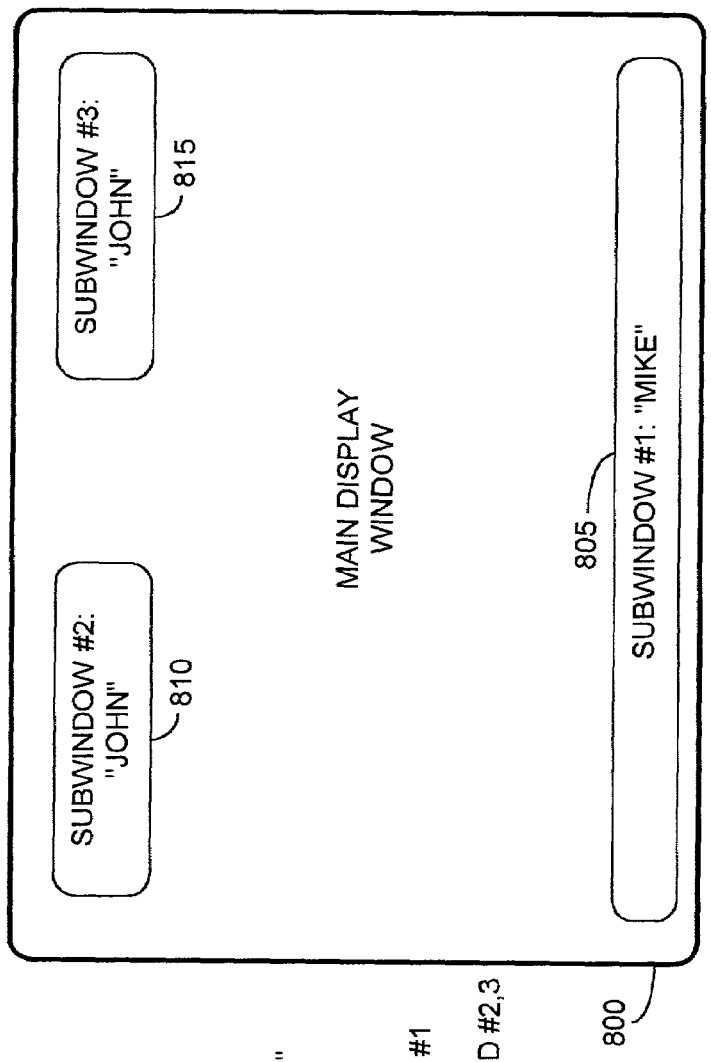
FIG. 8 illustrates a graphics display screen in which selected portions of the screen are allocated according to aspects of the invention herein.

FIG. 8 illustrates multiple processes (e.g., process "MIKE" and process "JOHN") having access to, and creating subwindows, frames, or panes which display process-related information in main display window 800, using one or more MPDA, provided such processes have been authorized by the arbiter to access that region of the display with a MPDA. In the example of FIG. 8, the gatekeeper (not shown) can be configured to grant processes "MIKE" and "JOHN" access to the arbiter (also not shown) for the purpose of requesting a MPDA operable on a subwindow, or predetermined region of main display window 800. All other process in this example are denied access to the arbiter and, thus, to a subwindow having a MPDA. With other processes blocked from access to the arbiter, processes "MIKE" and "JOHN" each may request a MPDA for subwindows 805, 810, 815 from the arbiter. Absent a request from process "MIKE," it is possible for process "JOHN" to be given control of, along with the right to use a MPDA, for each of subwindows 805, 810, 815. In the event processes "MIKE" and "JOHN" each simultaneously request a MPDA for the same subwindow or region of display 800, process "MIKE" is given priority to the MPDA, over process JOHN, as previously determined by the gatekeeper (not shown), responsive to rules programmed in the arbiter, (not shown) or data provided in a arbiter access control table (not shown). According to the exemplary rules, if process "MIKE" is in possession of the MPDA for subwindow #1 805, process "JOHN," having lower priority, will be denied access, until process "MIKE" has terminated, and relinquished the subwindow #1 MPDA that it possesses. In the instance where process "JOHN" controls a MPDA for each of subwindows 805, 810, 815, control of the MPDA for subwindow #1 805 is revoked by the arbiter, when use of subwindow #1 and control of the MPDA, is requested by, and granted to, process "MIKE," having higher priority. Process "MIKE" then is permitted to provide a persistent display in subwindow #1 805, regardless of the display information provided by other processes to main display window 800, due to its dominant and exclusive control of an MPDA for subwindow #1 805.

Figure 9:
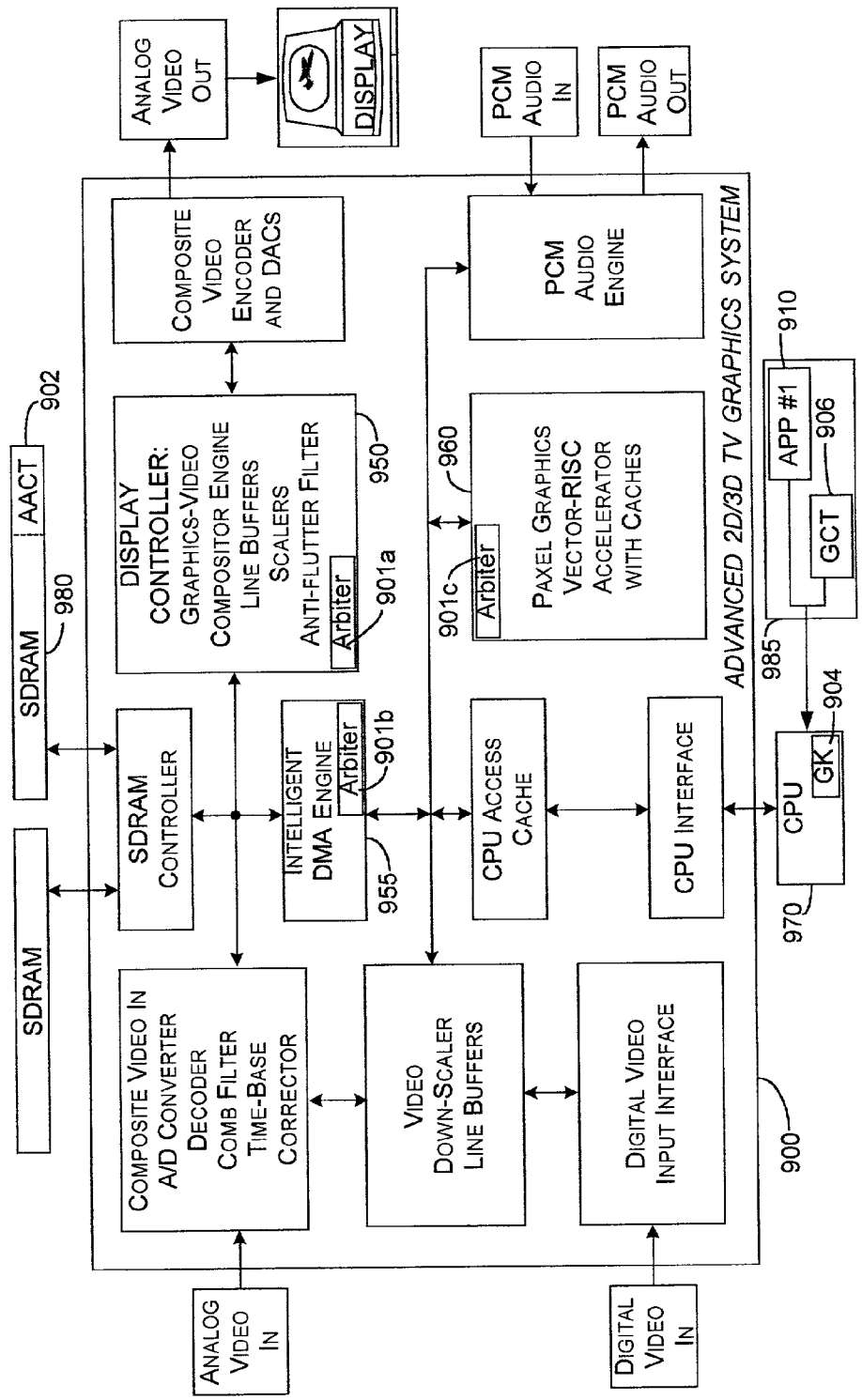
FIG. 9 is a block diagram of an advanced graphics display system which implements aspects of the present invention.

FIG. 9 illustrates another embodiment of the present invention as may be found in an advanced graphics system 900, such as the BCM7014 Advanced 2D/3D TV Graphics System by Broadcom Corp., Irvine, Calif., as well as similar devices. System 900 can be a highly-integrated, high-performance system for advanced graphics, text, analog video, digital video, animation, and audio applications advantageous for use with analog and digital set-top box, Digital TV, and television web browsing applications.

In this example, arbiter functionality can be implemented in Display Controller 950, Intelligent DMA Engine 955, Accelerator 960, or CPU 970, by providing respective arbiters 901a, 901b, 901c, or 901d. In addition, arbiter access control table 902 may be implemented in SDRAM 980 or system RAM 985. Furthermore, where it is desirable to include, for example, arbiter access pre-qualification by programs and processes, gatekeeper 904 can be implemented in CPU 970. Moreover, gatekeeper configuration table 906 can be implemented within system RAM 985. Similar to the functionality described with respect to FIGS. 1, 2, and 4, arbiter 901a, 901b, 901c, or 901d, is embodied in hardware, although, of course, it also may be realized in software, firmware, or combinations thereof.

Application 910 request access to display 920 by passing the requests through CPU 978, which request is then processed by display system 900. Where arbiter 901a is disposed in display controller 950 request for access is transferred to display controller 950, where arbiter 901a determines whether process 910 will be permitted to access display 920. Display system 900 can be coupled with a myriad of processing systems, including digital signal processing systems, which through CPU 970, can provide a suitable display input to display system 900.

It is important to note that when granted the MPDA, the dominant window is unable to be obscured by any other window or object by which the device represents data, and that the data represented is not confined to visually-oriented data but may include aural, tactile, or any perceptible data, alone or in combination. Furthermore, the inventive aspects of the present invention can be implemented on any device representing data, including traditional computers, pads, and tablets, wireless/cellular phones, handheld remote control device, handheld computing device, and the like, whether stand alone, networked, or web-based, and regardless of the medium by which data is transmitted transferred.

Many alterations and modifications may be made by those having ordinary skill in the art without departing from the spirit and scope of the invention. Therefore, it must be understood that the illustrated embodiments have been set forth only for the purposes of example, and that it should not be taken as limiting the invention as defined by the following claims. A skilled artisan would realize that the embodiments of the present invention can be realized in hardware, in software, or in advantageous combinations thereof, and thus are within the scope of the invention. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. An apparatus for producing a perceptible representation of program data windows, comprising:
    an arbiter adapted to:
      (a) select a program to be a dominant program from among a plurality of programs which have requested, from the arbiter, a master persistence attribute to display a program data window according to a predetermined priority hierarchy, and
      (b) assign the master persistence attribute to the selected program, wherein the program data window of the selected program is displayed concurrently with program data windows of other programs of the plurality of programs while not being obscured by the program data windows of the other programs or by a subsequent window being focused on or by a subsequent program requesting the master persistence attribute, and while overlapping at least one program data window of the other programs.

2. The apparatus of claim 1, further comprising:
an access control table, operationally coupled with the arbiter, adapted to contain indicia representative of the predetermined priority hierarchy.

3. The apparatus of claim 2, further comprising:
a configuration application program, operationally coupled with the access control table, adapted to configure the arbiter with the predetermined priority hierarchy.

4. The apparatus of claim 1, further comprising:
an I/O manager, operationally coupled with the arbiter, adapted to communicate display data for the perceptible representation between the plurality of programs and a display.

5. The apparatus of claim 4, further comprising:
a graphics device driver, operationally coupled with the I/O manager and the display, adapted to provide the display data to the display.

6. The apparatus of claim 1, further comprising:
a graphics device driver, operationally coupled with the arbiter, adapted to transmit the display data for the perceptible representation to a display.

7. The apparatus of claim 2, wherein the indicia include one of a process ID (PID), a window ID (WID), a priority, revoked and repudiated credentials, an authentication token or key, a master persistence attribute authorization, descriptive text, a program status, a system status, an accessible display region, and an excluded displayed region.

8. The apparatus claim 1, wherein the arbiter further comprises at least one of a rules engine, a state machine, and a content-addressable memory that provides the predetermined priority hierarchy for selecting the program to be the dominant program.

9. The apparatus of claim 6, further comprising a gatekeeper adapted to select given programs of the plurality of programs to be granted access to the arbiter to seek the master persistence attribute according to the predetermined priority hierarchy.

10. A graphic display apparatus, comprising:
a gatekeeper adapted to select given programs of a plurality of programs to be granted a key to request a persistence attribute according to a predetermined priority hierarchy, the persistence attribute enabling a selected program of the given programs, upon receipt of the persistence attribute, to display a program data window of the selected program concurrently with program data windows of the other given programs while not being obscured by the program data windows of the other programs, or by a subsequent window being focused on or by a subsequent program requesting the master persistence attribute, and while overlapping at least one program data window of the other given programs.

11. The graphic display apparatus of claim 10, further comprising:
a graphics device driver, operationally coupled with the gatekeeper, adapted to provide display data for the program data windows of the given programs to a display.

12. The graphic display apparatus of claim 11, further comprising:
an arbiter adapted to:

(a) select a program to be a dominant program from the given programs seeking the persistence attribute, and
(b) assign the persistence attribute to the selected program.

13. The graphic display apparatus of claim 12, further comprising:
an access control table, operationally coupled with the arbiter, adapted to store indicia representative of the predetermined priority hierarchy.

14. The graphic display apparatus of claim 10, further comprising:
an I/O manager, operationally coupled with the gatekeeper, adapted to manage communication of graphical data between the given programs and a display.

15. The graphic display apparatus of claim 10, further comprising:
an application manager, operationally coupled with the gatekeeper, adapted to prevent unauthorized access to an operating system by the given programs.

16. The graphic display apparatus of claim 15, further comprising:
a graphics device driver, operationally coupled with the application manager, adapted to provide graphical data to display the program data windows of the given programs on the display.

17. The graphics display apparatus of claim 10, further comprising:
a configuration application program, operationally coupled with the gatekeeper, adapted to configure the gatekeeper with the predetermined priority hierarchy.

18. The graphic display apparatus of claim 10, further comprising:
a configuration table, operationally coupled with the gatekeeper, adapted to store indicia representative of the predetermined priority hierarchy.

19. The apparatus of claim 18, wherein the indicia include one of a process ID (PID), a window ID (WID), a priority, revoked and repudiated credentials, an authentication token or key, a master persistence attribute authorization, descriptive text, a program status, a system status, an accessible display region, and an excluded display region.

20. A graphic display apparatus comprising:
(a) a gatekeeper adapted to select given programs of a plurality of programs which have requested, from the gatekeeper, to be granted a master persistence display attribute according to a predetermined priority hierarchy, and
(b) an arbiter adapted to:
(1) select a program to be a dominant program from the given programs; and
(2) assign the master persistence display attribute to the selected program according to the predetermined priority hierarchy,
wherein the apparatus displays a program data window of the selected program concurrently with program data windows of other programs of the given programs while not being obscured by the program data windows of the other programs, or by a subsequent window being focused on or by a subsequent program requesting the master persistence attribute, and while overlapping at least one program data window of the other programs.

21. The graphic display apparatus of claim 20, further comprising:
one of (i) a configuration table, operationally coupled with at least one of the arbiter and the gatekeeper, adapted to contain first indicia representative of the predetermined priority hierarchy, and (ii) an access control table, operationally coupled with at least one of the arbiter and the gatekeeper, adapted to contain second indicia representative of the predetermined priority hierarchy.

22. The graphic display apparatus of claim 20, further comprising:
a configuration application, operationally coupled with at least one of the configuration table and the access control table, adapted to configure at least one of the arbiter and the gatekeeper.

23. The graphic display apparatus of claim 20, further comprising:
an I/O manager, operationally coupled with at least one of the arbiter and the gatekeeper, adapted to communicate display data for the program data windows of the selected program and the other programs between at least one application program and a display.

24. The graphic display apparatus of claim 23, further comprising:
a graphics device driver, operationally coupled with the I/O manager and the display, adapted to provide the display data to the display.

25. The graphic display apparatus of claim 24, further comprising:
a display buffer operationally coupled with the graphic device driver.

26. The graphic display apparatus of claim 20, further comprising:
a graphics device driver, operationally coupled with at least one of the arbiter and the gatekeeper, adapted to provide display data to a display.

27. The graphic display apparatus of claim 26, further comprising:
a display buffer operationally coupled with the graphics device driver.

28. The graphic display apparatus of claim 26, further comprising:
an I/O manager, operationally coupled with the graphics device driver, adapted to facilitate communication between an application program and the display.

29. The graphic display apparatus of claim 20 further comprising:
an application manager, operationally coupled with at least one of the gatekeeper and the arbiter, adapted to prevent unauthorized access to an operating system by the given programs.

30. The apparatus of claim 21, wherein at least one of the first indicia and the second indicia include one of a process ID (PID), a window ID (WID), a priority, revoked and repudiated credentials, an authentication token or key, a master persistence attribute authorization, descriptive text, a program status, a system status, an accessible display region, and an excluded display region.

31. A graphics system comprising:
(a) a video input adapted to receive a graphical data signal;
(b) a video output operationally coupled with a display;
(c) a display controller operationally coupled with the video input and adapted to selectively transmit the graphical data signal to the video output; and
(d) an arbiter operationally coupled with the display controller, the arbiter adapted to effect the selective transmission by granting a persistence attribute, according to a predetermined priority hierarchy, to a window associated with a program which has requested, from the arbiter, the persistence attribute for displaying data on the display, the display controller adapted to selectively transmit responsive to the arbiter,
wherein the video output is further adapted to write data to a set of pixel memory locations, which are later read by the display, and
wherein the window which has been granted the persistence attribute by the arbiter has exclusive access to a portion of the set of pixel memory locations in place of at least one other window which would otherwise have access to the portion of the set of pixel memory locations or by a subsequent window being focused on or by a subsequent program requesting the master persistence attribute, and while overlapping at least one program data window of other programs.

32. The graphics system of claim 31, further comprising a CPU interface adapted to operationally couple the graphics system to a CPU, the CPU adapted to receive display control signals and the arbiter adapted to be responsive thereto.

33. The graphics system of claim 32, wherein the CPU includes a gatekeeper operationally coupled with the arbiter and adapted to transmit the predetermined priority hierarchy thereto.

34. The graphics system of claim 32, wherein the CPU includes a gatekeeper operationally coupled with the arbiter and adapted to select display control signals having access to the arbiter.

35. The graphics system of claim 34, further comprising an arbiter access control table adapted to receive indicia relevant to the predetermined priority hierarchy.

36. The graphics system of claim 35, wherein the indicia include one of a process ID (PID), a window ID (WID), a priority, revoked and repudiated credentials, an authentication token or key, a master persistence attribute authorization, descriptive text, a program status, a system status, an accessible display region, and an excluded display region.

37. A method of assigning a persistence attribute to at least one of a plurality of programs, the method comprising:
(a) requesting a master persistence attribute from a gatekeeper;
(b) assigning a set of priority rules to the gatekeeper via a configuration application program;
(c) granting keys to given program of the plurality of programs with the gatekeeper, the keys adapted to allow the given program access to an arbiter;
(d) examining an arbiter access control table with the arbiter, the arbiter access control table being adapted to store a predetermined priority hierarchy; and
(e) assigning the persistence attribute to a selected program of the given programs, the persistence attribute adapted to grant the selected program access to a dominant display window,
wherein the dominant display window is adapted to display data of the selected program concurrently with display windows of other programs of the given programs while not being obscured by the display windows of the other programs, or by a subsequent window being focused on or by a subsequent program requesting the master persistence attribute, and while overlapping at least one of the display windows of the other programs.

38. A computer readable storage medium having recorded thereon a computer program product for assigning a master persistence attribute to a selected program of a plurality of programs which have requested the master persistence attribute from an arbiter, the computer program product comprising:
(a) computer readable program code that, when executed, provides a gatekeeper adapted to grant an access token to the plurality of programs, the access token adapted to allow access to the arbiter according to a predetermined access hierarchy; and (b) computer readable program code by which the arbiter assigns the master persistence attribute to the selected program, thereby granting access to a dominant display window, wherein the dominant display window is adapted to display data of the selected program concurrently with display windows of other programs while not being obscured by the display windows of the other programs, or by a subsequent window being focused on or by a subsequent program requesting the master persistence attribute, and while overlapping at least one display window of the other programs.

39. The storage medium of claim 38, further comprising computer readable program code by which the arbiter examines an arbiter access control table adapted to store the predetermined access hierarchy.

40. The storage medium of claim 39, further comprising computer readable program code adapted to assign a set of access rules to the gatekeeper and to assign a set of priority rules to the arbiter using a configuration application program.

41. A method of assigning a master persistence display attribute to a selected application program of a plurality of application programs, the method comprising:

(a) requesting the persistence attribute from a gatekeeper;

(b) accessing, with the gatekeeper, a configuration table adapted to store a predetermined priority hierarchy;

(c) granting, with the gatekeeper, keys to given application programs of the plurality of programs;

(d) applying the keys, with the given application programs, to access an arbiter adapted to examine an arbiter access control table adapted to store the predetermined priority hierarchy; and (e) assigning, with the arbiter, the master persistence display attribute to the selected application program, the master persistence attribute adapted to grant the selected program access to a dominant display window, wherein the selected program displays data in the dominant display window concurrently with display windows of other programs of the given programs while not being obscured by the display windows of the other programs, or by a subsequent window being focused on or by a subsequent program requesting the master persistence attribute, and while overlapping at least one of the display windows of the other programs.

42. An apparatus for producing a perceptible representation of program data windows, the apparatus comprising an arbiter adapted to select a program to be a dominant program from among a plurality of programs which have requested a master persistence attribute to display a program data window according to a predetermined priority hierarchy, and to assign the master persistence attribute to the selected program, wherein the perceptible representation of program data windows is rendered on one of a computer, a communication pad, a telephony device, a handheld remote control device, and a handheld computing device, and wherein the selected program displays a dominant program data window concurrently with program data windows of other programs while not being obscured by the program data window of the other programs, or by a subsequent window being focused on or by a subsequent program requesting the master persistence attribute, and while overlapping at least one program data window of the other programs.

43. The apparatus of claim 42 wherein a medium by which data is communicated to the apparatus comprises one of a wireless/RF channel, a wire-based channel, a cable-based channel, and a fiberoptic channel.

* * * * *

UNITED STATES PATENT AND TRADEMARK OFFICE
CERTIFICATE OF CORRECTION

PATENT NO. : 7,478,341 B2  Page 1 of 1
APPLICATION NO. : 09/838695
DATED : January 13, 2009
INVENTOR(S) : Michael Dove It is certified that error appears in the above-identified patent and that said Letters Patent is hereby corrected as shown below:

Column 13, Line 57, please delete "master"

Column 14, Line 38, please delete "master"

Column 16, Line 41, before "given" please insert --a--

Signed and Sealed this

Twelfth Day of May, 2009

JOHN DOLL
*Acting Director of the United States Patent and Trademark Office*